United States Patent
Anderson et al.

(10) Patent No.: US 9,322,361 B2
(45) Date of Patent: Apr. 26, 2016

(54) GASEOUS FUEL MIXER FOR INTERNAL COMBUSTION ENGINE

(71) Applicant: CUMMINS INC., Columbus, IN (US)

(72) Inventors: Alan C. Anderson, Columbus, IN (US); David P. Richter, Columbus, IN (US); Matthew Keith Sease, Columbus, IN (US); Philip M. Medalie, Bloomsburg, PA (US)

(73) Assignee: CUMMINS INC., Columbus, IN (US)

( * ) Notice: Subject to any disclaimer, the term of this patent is extended or adjusted under 35 U.S.C. 154(b) by 25 days.

(21) Appl. No.: 13/961,565

(22) Filed: Aug. 7, 2013

(65) Prior Publication Data
US 2015/0040562 A1 Feb. 12, 2015

(51) Int. Cl.
*F02M 21/04* (2006.01)
*F02M 35/10* (2006.01)

(52) U.S. Cl.
CPC ....... *F02M 21/042* (2013.01); *F02M 35/10275* (2013.01)

(58) Field of Classification Search
CPC ... F02M 9/123; F02M 9/127; F02M 21/0203; F02M 21/0242; F02M 21/042; F16K 15/028
USPC .................. 60/605.1; 123/527, 528, 529, 590
See application file for complete search history.

(56) References Cited

U.S. PATENT DOCUMENTS

| | | | |
|---|---|---|---|
| 3,464,803 A | 9/1969 | Kimberley | |
| 4,424,676 A * | 1/1984 | Meiners | ................ 60/605.1 |
| 5,245,977 A | 9/1993 | Chen et al. | |
| 6,810,863 B2 | 11/2004 | Memmott et al. | |
| 7,747,378 B2 | 6/2010 | Shiraishi et al. | |
| 2004/0089276 A1 | 5/2004 | Memmott et al. | |
| 2008/0127950 A1* | 6/2008 | Malm | ............. F02B 43/10 123/527 |
| 2013/0263590 A1* | 10/2013 | Kempf et al. | ................ 60/605.1 |
| 2014/0209075 A1* | 7/2014 | Luft et al. | .................. 123/590 |

FOREIGN PATENT DOCUMENTS

| | | |
|---|---|---|
| FR | 8554 | 5/1908 |
| GB | 2326484 | 12/1998 |
| WO | 9525883 | 9/1995 |

OTHER PUBLICATIONS

TLV Co., Ltd., "Compact Check Valve," archived as early as Dec. 3, 2009.*
Search Report issued by the European Patent Office for Application No. EP14179205.1, dated Oct. 11, 2014; 5 pages.

* cited by examiner

*Primary Examiner* — Audrey K Bradley
(74) *Attorney, Agent, or Firm* — Faegre Baker Daniels LLP

(57) ABSTRACT

A gaseous fuel mixer for an internal combustion engine includes a check valve. The check valve includes a check valve member that induces mixing of a gaseous fuel flow and an intake air flow as the gaseous fuel flow and intake air flow move or pass from an upstream side of the check valve to a downstream side of the check valve.

22 Claims, 3 Drawing Sheets

GASEOUS FUEL MIXER FOR INTERNAL COMBUSTION ENGINE

TECHNICAL FIELD

This disclosure relates to a gaseous fuel mixer for an internal combustion engine, particularly for a gaseous fuel engine.

BACKGROUND

Internal combustion engines have been adapted to use alternative fuels, such as gaseous fuels, including natural gas. One challenge with gaseous fuel engines is optimizing mixing of intake air and the gaseous fuel, particularly in a small package size.

SUMMARY

This disclosure provides an internal combustion engine comprising an intake manifold, an air intake conduit, a plurality of fuel flow passages, and a check valve. The air intake conduit includes a longitudinal axis and directs an air flow along the longitudinal axis. The plurality of fuel flow passages is configured to provide a fuel flow into the air intake conduit to create a combined flow of air and fuel. The check valve includes a check valve member movable along the longitudinal axis between a closed position and an open position. The check valve member is positioned downstream from the plurality of fuel flow passages and has an upstream side and a downstream side. The check valve member is operable to selectively permit the combined flow into the intake manifold and the check valve member is sized and dimensioned to induce mixing of the fuel flow and the air flow as the fuel flow and the air flow pass from the upstream side to the downstream side.

This disclosure also provides a fuel mixer for an internal combustion engine, comprising an inlet, an outlet, and a check valve positioned between the inlet and the outlet. The inlet receives an air flow and a fuel flow. The check valve is positioned between the inlet and the outlet. The check valve includes a check valve member movable longitudinally between a closed position and an open position. The check valve member has an upstream side and a downstream side and is positioned to selectively permit the air flow and the fuel flow into the intake manifold. The check valve member is sized and dimensioned to induce mixing of the air flow and the fuel flow as the air flow and the fuel flow moves downstream from the check valve.

This disclosure also provides a method of mixing high-pressure intake air flow and high-pressure fuel flow in an internal combustion engine. The method comprises positioning a check valve in the intake air flow and the fuel flow, opening the check valve under the force of the intake air flow and the fuel flow, and mixing the intake air flow and the fuel flow as the intake air flow and the fuel flow pass from an upstream side of the check valve to a downstream side of the check valve.

Advantages and features of the embodiments of this disclosure will become more apparent from the following detailed description of exemplary embodiments when viewed in conjunction with the accompanying drawings.

DETAILED DESCRIPTION

Figure 1:
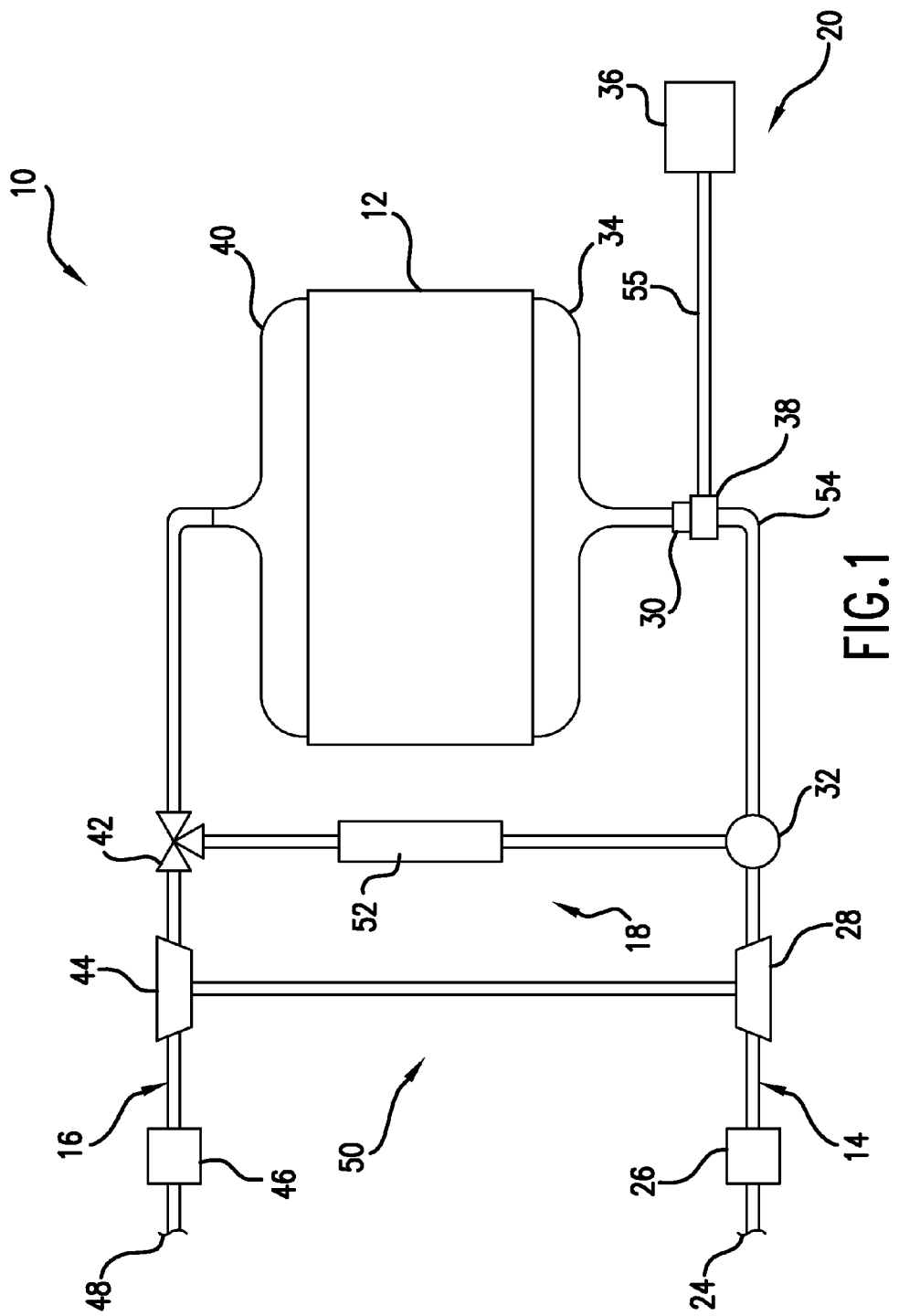
FIG. 1 is a schematic of an internal combustion engine including an exemplary embodiment of the present disclosure.

Referring to FIG. 1, a portion of an internal combustion engine is shown as a simplified schematic and generally indicated at 10. Engine 10 includes an engine body 12, an intake circuit 14, an exhaust circuit 16, an optional exhaust gas recirculation (EGR) system 18, and a gaseous fuel system 20. Engine 10 includes a gaseous fuel mixer that provides for efficient mixing in a relatively small package size because of the configuration of the mixer. The ability to achieve optimal mixing of a gaseous fuel in a small package size enables using the gaseous fuel mixer described hereinbelow in a variety of engine applications and configurations.

Intake circuit 14 connects to engine body 12 and includes an inlet portion 24, a filtration portion 26, a compressor 28, a gaseous fuel mixer 30, and an intake manifold 34. Inlet portion 24 permits external air to enter intake circuit 14, thus becoming intake air. Compressor 28 is positioned along intake circuit 14 downstream from inlet portion 24 and functions to pressurize the intake air for delivery to intake manifold 34. Filtration portion 26 is positioned along intake circuit 14 between inlet portion 24 and compressor 28, upstream from compressor 28. An EGR mixer 32 may be positioned along intake circuit 14 between compressor 28 and intake manifold 34, and functions to provide a mixture of EGR gas and intake air to intake manifold 34. Intake manifold 34 connects to engine body 12. Gaseous fuel mixer 30 is positioned along intake circuit 14, downstream from EGR mixer 32 and upstream from intake manifold 34.

Gaseous fuel system 20 provides a source of gaseous fuel, such as natural gas, to intake circuit 14 and includes a gaseous fuel supply 36, a fuel supply header or gas supply manifold 38, which receives gaseous fuel from gaseous fuel supply 36, and a supply system 55, which connects gaseous fuel supply 36 with gas supply manifold 38. Gaseous fuel supply 36 may be a gas pipeline, a storage system or tank, a gaseous fuel generator, gaseous fuel from a ground source such as a well or land fill, or other source of gaseous fuel. Supply system 55 may include a pipe, conduit, tube, hose, or other similar device to direct or guide gaseous fuel from gaseous fuel supply 36 to gas supply manifold 38. Gaseous fuel system 20 may include other elements, such as pressure regulators and valves (not shown), to regulate the flow of gaseous fuel to intake circuit 14.

Exhaust circuit 16 connects to engine body 12 and includes an exhaust manifold 40, a turbine 44, an optional aftertreatment system 46, and an atmospheric vent 48. Exhaust manifold 40 connects to engine body 12. Turbine 44 is positioned along exhaust circuit 16 downstream from exhaust manifold 40. Optional aftertreatment system 46 is positioned along exhaust circuit 16 between turbine 44 and atmospheric vent 48, downstream from turbine 44 and upstream from vent 48. Other elements may be positioned along exhaust circuit 16, such as an exhaust silencer.

High-pressure exhaust gas from one or more combustion chambers (not shown) located in engine body 12 is guided into exhaust circuit 16 by exhaust manifold 40. The high-pressure exhaust gas drives turbine 44 of a turbocharger 50, which further drives compressor 28. While the exemplary embodiment includes turbocharger 50, in another embodiment, compressor 28 may be driven by a supercharger. The exhaust gas flows downstream from turbine 44 to optional aftertreatment system 46, which may include one or more filters, one or more catalysts, and/or one or more selective catalytic reduction devices. The aftertreatment system operates to remove particulates and certain emissions from the exhaust gas, e.g., NOx.

Optional EGR system 18 may extend from exhaust circuit 16 to intake circuit 14. EGR system 18 includes an EGR valve 42, EGR mixer 32, and an EGR cooler 52. EGR valve 42 is positioned along exhaust circuit 16 downstream from exhaust manifold 40 and is operable to permit exhaust gas to flow into EGR system 18. EGR cooler 52 is positioned along EGR system 18 downstream from EGR valve 42 and is operable to remove heat from the EGR exhaust gas before the EGR exhaust gas enters EGR mixer 32, where the EGR gas mixes with intake air before flowing downstream to intake manifold 34.

Figure 2:
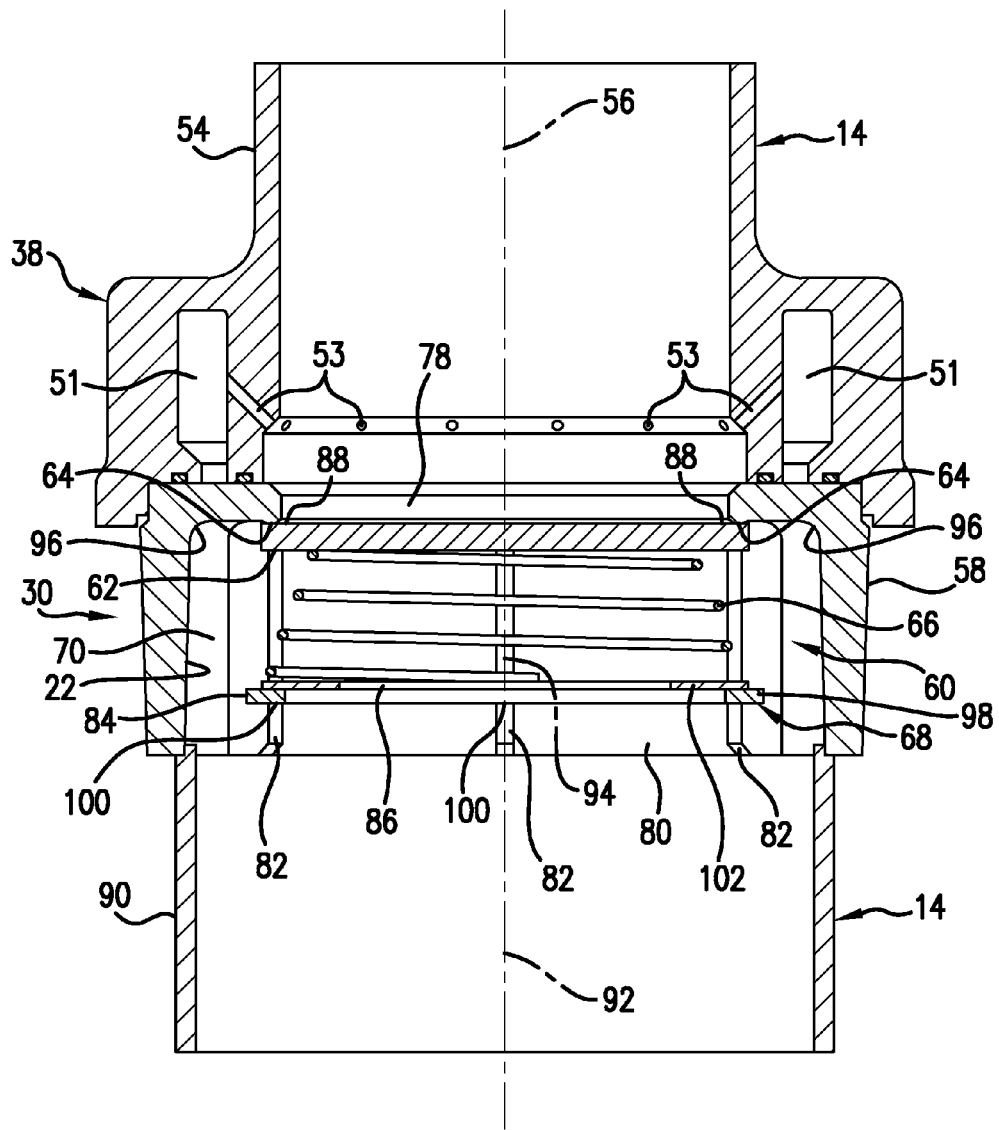
FIG. 2 is a gaseous fuel mixer of the internal combustion engine of FIG. 1 in accordance with an exemplary embodiment of the present disclosure, with a check valve member in a closed position.

Referring now to FIG. 2, gaseous fuel mixer 30 in accordance with an exemplary embodiment of the present disclosure is shown. As described hereinabove, gaseous fuel mixer 30 is positioned along intake circuit 14. Intake circuit 14 includes an air intake conduit 54 having a longitudinal axis 56. Air intake conduit 54 is configured to direct air flow along longitudinal axis 56 toward gaseous fuel mixer 30. Upstream from gaseous fuel mixer 30 is gas supply manifold 38, which provides gaseous fuel from gaseous fuel system 20 to air intake conduit 54 of intake circuit 14. Gas supply manifold 38 includes an annular manifold gallery 51 and a plurality of fuel transfer or inlet passages 53. Manifold gallery 51 extends circumferentially around air intake conduit 54, and fuel transfer passages 53 extend from manifold gallery 51 into intake circuit 14 at spaced circumferential intervals. The circumferential spacing of fuel transfer passages 53 assists in the distribution of gaseous fuel from gas supply manifold 38 into intake circuit 14.

Gaseous fuel mixer 30 includes a check valve body, mixer body, or valve housing 58, a check valve 60 that includes a longitudinally movable check valve member 62 positioned within mixer body 58, a check valve seat 64 located on an inner surface 22 of mixer body 58, a bias spring 66 positioned in mixer body 58 to bias check valve member 62 into a closed position against check valve seat 64, a spring support 68 positioned in mixer body 58 that provides a fixed location for one end of bias spring 66, and a mixer passage 70 formed by inner surface 22. Mixer body 58 is secured to air intake conduit 54, and may be secured by way of threads, clamping, or other attachment system. Spring support 68 may be secured or connected to inner surface 22 of mixer body 58 by a plurality of support ribs or pilasters 82. Support ribs 82 extend from inner surface 22 toward longitudinal axis 56 and attach or connect to a peripheral surface 84 of spring support 68. In the exemplary embodiment, spring support 68 includes a retaining ring 98 that expands into a plurality of grooves or channels 100 formed in ribs 82 such that a peripheral surface 84 of retaining ring 98 engages grooves or channels 100. In the exemplary embodiment, spring support 68 further includes a washer 102 that provides support for bias spring 66. During assembly of gaseous fuel mixer 30, check valve member 62 is inserted into mixer body outlet 80 so that check valve member 62 rests against check valve seat 64. Bias spring 66 is then inserted into mixer body outlet 80, followed by washer 102. Check valve member 62, bias spring 66, and washer 102 are centrally positioned by proximity of these components to support ribs 82. Retaining ring 98 is then positioned to engage grooves 100 to secure check valve member 62, bias spring 66, and washer 102 within mixer body 58.

Washer 102 may include a central opening 86, which permits air flow therethrough when check valve 60 is less than fully open. Mixer body 58 includes an inlet 78 and an outlet 80. Check valve member 62 is shown positioned in contact with check valve seat 64 in FIG. 2, which is a closed position for check valve 60. In the closed position, check valve member 62 provides at least a partial fluid seal with check valve seat 64. Check valve member 62 is shaped as a flat plate that is generally circular and configured to mate with check valve seat 64 when check valve 60 is in a closed position.

Inner surface 22 includes a plurality of portions. As described hereinabove, inner surface 22 includes valve seat 64, which is formed as a radially extending surface that extends circumferentially about longitudinal axis 56. In the exemplary embodiment, valve seat 64 is a flat surface that is located entirely in a single flat plane. Check valve member 62 includes a member surface 88 that contacts valve seat 64 when check valve member 62 is biased into the closed positioned. In the exemplary embodiment, member surface 88 is a flat surface that is located entirely in a single flat plane. Note that member surface 88 needs only to extend annularly about longitudinal axis 56 in a location where check valve member 62 contacts valve seat 64 as opposed to extending entirely across the surface of check valve member 62. In the exemplary embodiment, member surface 88 extends entirely across the top or upper side of check valve member 62. Thus, in the exemplary embodiment the entirety of the top or upper side of check valve member 62 lies in a single flat plane that extends perpendicular to longitudinal axis 56.

From valve seat 64, inner surface 22 extends outwardly and then turns to extend longitudinally in a direction that is along longitudinal axis 56. A radius portion 96 is positioned between valve seat 64 and the longitudinally-extending portion of inner surface 22. The longitudinally-extending portion of inner surface 22 extends in a direction that is approximately perpendicular to valve seat 64, excluding any draft required to form the longitudinally-extending portion of inner surface 22. In an exemplary embodiment, the longitudinally-extending portion of inner surface 22 forms a cylinder having a longitudinal axis 94 that extends perpendicularly to valve seat 64. As described hereinabove, support ribs 82 extend from the longitudinally-extending portion of inner surface 22 in a direction that is generally toward longitudinal axis 56.

Figure 3:
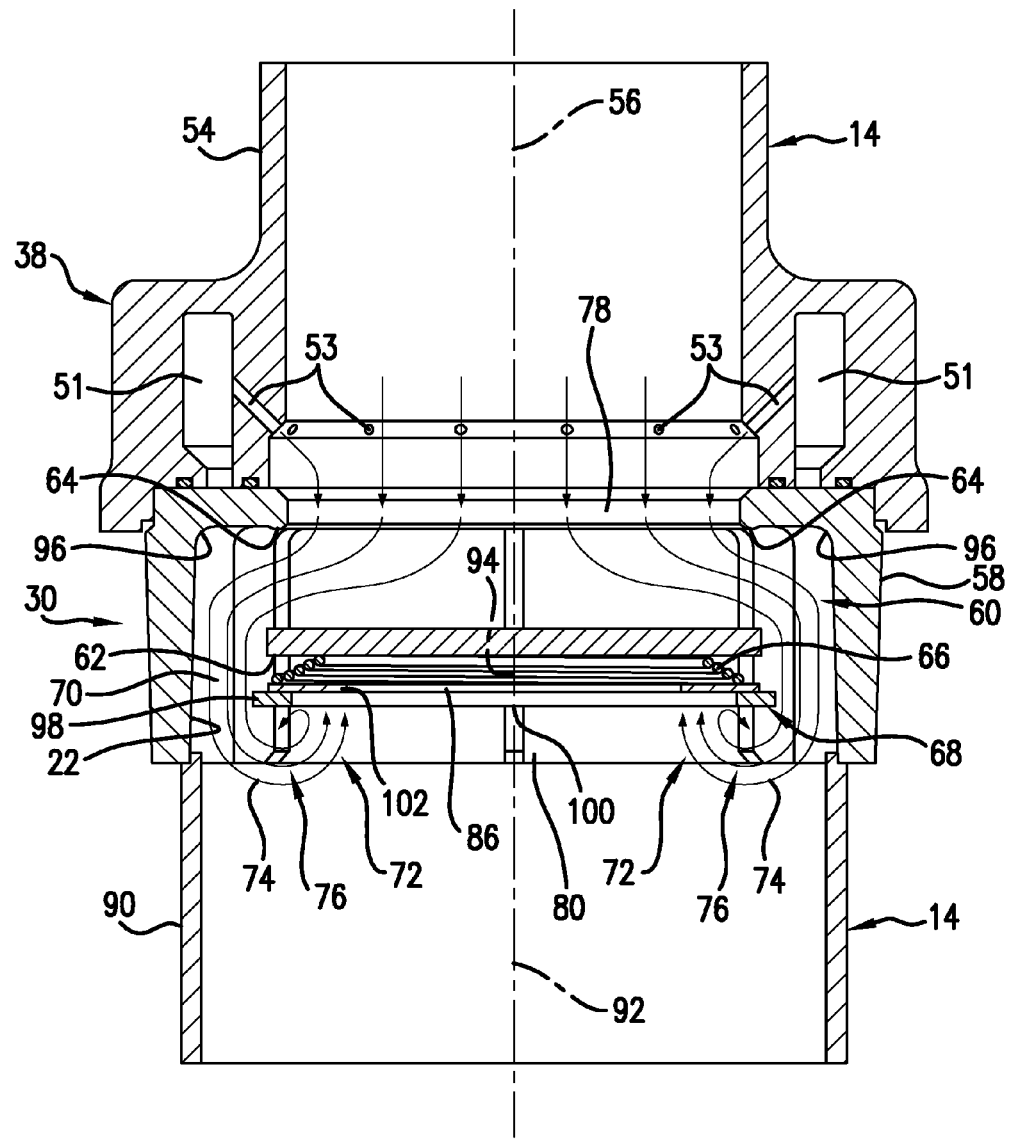
FIG. 3 is the gaseous fuel mixer of FIG. 2, with the check valve member in an open position.

FIG. 3 shows gaseous fuel mixer 30 with check valve 60 in an open position. Intake air moves into mixer body inlet 78 of gaseous fuel mixer 30 by a combination of vacuum pressure in engine body 12 and pressure from compressor 28 of turbocharger 50. The force of the flowing air from upstream of gaseous fuel mixer 30 is sufficient to move check valve member 62 away from check valve seat 64, compressing bias spring 66. Thus, check valve member 62 is movable between the closed position and the open position to selectively permit air flow and fuel flow into intake manifold 34. In addition to selectively permitting air and fuel flow to intake manifold 34, check valve 60 can prevent an intake manifold overpressure from propagating upstream of check valve 60, preventing damage to components upstream of check valve 60.

As the flowing air moves past fuel transfer passages 53, gaseous fuel system 20 injects or inserts gaseous fuel at high pressure into the flowing air stream. Because the flowing air is typically under relatively high pressure by the action of compressor 28, the gaseous fuel needs pressurized by gaseous fuel system 20 at an even higher pressure in order for the fuel to move from manifold gallery 51 through fuel transfer passages 53 into a central passage of air intake conduit 54. Because of the velocity of air flow, the injected gaseous fuel tends to remain near the periphery of the flow of air, thus requiring a gas mixer to decrease the stratification of gaseous fuel and intake air.

Conventional gas mixers provide an array of configurations for the mixing of gaseous fuel and intake air. Applicants determined through analysis and experimentation that a flat plate check valve can be sized and dimensioned to provide or induce mixing of gaseous fuel and intake air as the gaseous fuel and intake air flow or pass from the upstream side of check valve 60 to the downstream side of check valve 60. As shown in FIG. 3, when gaseous fuel and intake air flows or passes, from the upstream side to the downstream side of check valve member 62, the gaseous fuel and intake air flow into a region 72 on the downstream side of check valve member 62. The turbulence in region 72 causes a churning or mixing effect on the gaseous fuel, represented by flow lines 74, and intake air, represented by flow lines 76. The turbulence generated in region 72 continues as gaseous fuel and intake air flow from mixer body outlet 80 in the form of a combined air/fuel flow. The combined air/fuel flow continues to mix as the combined flow passes from mixer body outlet 80 into air intake circuit 14, which includes a downstream conduit 90 having a longitudinal axis 92. In the exemplary embodiment, downstream conduit longitudinal axis 92 is coaxial with longitudinal axis 56 and with mixer body longitudinal axis 94. Downstream conduit 90 is secured to mixer body 58, and may be secured by way of threads, clamping, or other attachment systems. The result of the turbulence is sufficient mixing of gaseous fuel and intake air to provide an efficient combustion process when the gaseous fuel and intake air enter engine body 12. Because of packaging constraints in a typical internal combustion engine, fuel mixer 30 needs to be as close to fuel transfer passages 53 as possible. Furthermore, fuel mixer 30 also needs to be as close to intake manifold 34 as possible. Because of the quality of the mixing of fuel and air provided by check valve 60, fuel mixer 30 may be positioned a distance from intake manifold 34 or may be positioned adjacent or next to intake manifold 34.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

We claim:

1. An internal combustion engine, comprising:
an intake manifold;
an air intake conduit, including a longitudinal axis, to direct an air flow along the longitudinal axis;
a plurality of fuel flow passages configured to provide a fuel flow into the air intake conduit to create a combined flow of air and fuel; and
a check valve including a check valve member movable toward and away from the plurality of fuel flow passages along the longitudinal axis between a closed position and an open position, the check valve member positioned downstream from the plurality of fuel flow passages and having an upstream side and a downstream side, the check valve member operable to selectively permit the combined flow through the air intake conduit into the intake manifold, the check valve member sized and dimensioned to induce mixing of the fuel flow and the air flow as the fuel flow and the air flow pass from the upstream side to the downstream side.

2. The internal combustion engine of claim 1, wherein the check valve member is formed as a plate.

3. The internal combustion engine of claim 2, wherein the plate is a flat plate.

4. The internal combustion engine of claim 1, wherein the check valve member is biased in the closed position.

5. The internal combustion engine of claim 4, wherein the check valve member is biased in the closed position by a spring.

6. The internal combustion engine of claim 1, wherein the air flow is pressurized by a turbocharger.

7. The internal combustion engine of claim 6, wherein the fuel flow is under a pressure higher than the pressure of the turbocharged air flow.

8. The internal combustion engine of claim 1, wherein the plurality of fuel flow passages are spaced around the air intake conduit.

9. The internal combustion engine of claim 8, further including a fuel supply gallery extending around the air intake conduit, and the plurality of fuel flow passages routes the fuel flow from the fuel supply gallery to the air intake conduit.

10. A fuel mixer for an internal combustion engine, comprising:
an inlet for receiving an air flow and a fuel flow;
an outlet; and
a check valve positioned between the inlet and the outlet, the check valve including a check valve member movable longitudinally between a closed position and an open position, the check valve member having an upstream side and a downstream side and positioned to selectively permit the air flow and the fuel flow directly into an intake manifold of the engine, the check valve member sized and dimensioned to induce mixing of the air flow and the fuel flow as the air flow and the fuel flow moves downstream from the check valve;
wherein the inlet receives the fuel flow from a plurality of fuel flow passages spaced around the inlet.

11. The fuel mixer of claim 10, wherein the check valve member is formed as a plate.

12. The fuel mixer of claim 11, wherein the plate is a flat plate.

13. The fuel mixer of claim 10, wherein the check valve member is biased in the closed position.

14. The fuel mixer of claim 13, wherein the check valve member is biased in the closed position by a spring.

15. The fuel mixer of claim 10, wherein the air flow is pressurized by a turbocharger.

16. The fuel mixer of claim 15, wherein the fuel flow is under a pressure higher than the pressure of the turbocharged air flow.

17. A method of mixing high-pressure intake air flow and high-pressure fuel flow in an internal combustion engine, the method comprising:
positioning a check valve in the intake air flow and the fuel flow;
receiving the fuel flow into an air intake conduit from a plurality of fuel flow passages at the upstream side of the check valve, the plurality of fuel flow passages being configured to provide fuel flow into the air intake conduit to create a combined flow of air and fuel;
moving the check valve under the force of the intake air flow and the fuel flow away from the plurality of fuel flow passages from a closed position to an open position;
mixing the intake air flow and the fuel flow as the intake air flow and the fuel flow pass from an upstream side of the check valve to a downstream side of the check valve by generating a turbulence at the downstream side of the check valve; and delivering the mixed intake air flow and fuel flow from the downstream side of the check valve directly into an intake manifold of the engine.

18. The method of claim 17, wherein the air flow is pressurized by a turbocharger.

19. The method of claim 18, wherein the fuel flow is under a pressure higher than the pressure of the turbocharged air flow.

20. The method of claim 17, wherein the check valve includes a check valve member formed as a plate, and wherein the plate moves longitudinally between the closed position and the open position.

21. The method of claim 20, wherein the check valve member is biased in the closed position.

22. The method of claim 21, wherein the check valve member is biased in the closed position by a spring.

* * * * *